United States Patent
Moeller et al.

(10) Patent No.: US 10,230,472 B2
(45) Date of Patent: Mar. 12, 2019

(54) POLARIZATION MODULATION OF SUPERVISORY SIGNALS FOR REDUCING INTERFERENCE WITH DATA SIGNALS

(71) Applicant: SubCom, LLC, Eatontown, NJ (US)

(72) Inventors: Lothar Moeller, Middletown, NJ (US); Bamdad Bakhshi, Asbury Park, NJ (US)

(73) Assignee: SubCom, LLC, Eatontown, NJ (US)

( * ) Notice: Subject to any disclaimer, the term of this patent is extended or adjusted under 35 U.S.C. 154(b) by 0 days.

(21) Appl. No.: 15/438,880

(22) Filed: Feb. 22, 2017

(65) Prior Publication Data

US 2017/0359127 A1    Dec. 14, 2017

Related U.S. Application Data

(60) Provisional application No. 62/347,268, filed on Jun. 8, 2016.

(51) Int. Cl.

| | |
|---|---|
| *H04B 10/25* | (2013.01) |
| *H04B 17/00* | (2015.01) |
| *H04Q 11/00* | (2006.01) |
| *H04J 14/02* | (2006.01) |
| *H04J 14/06* | (2006.01) |
| *H04B 10/532* | (2013.01) |
| *H04B 10/58* | (2013.01) |
| *H04B 10/077* | (2013.01) |
| *H04B 10/2569* | (2013.01) |

(52) U.S. Cl.
CPC ......... *H04B 10/532* (2013.01); *H04B 10/077* (2013.01); *H04B 10/2569* (2013.01); *H04B 10/58* (2013.01); *H04J 14/02* (2013.01); *H04J 14/06* (2013.01)

(58) Field of Classification Search
CPC ............. H04B 10/532; H04B 10/077; H04B 10/2569; H04B 10/58; H04J 14/02; H04J 14/06
USPC .............................................. 398/65, 64, 30
See application file for complete search history.

(56) References Cited

U.S. PATENT DOCUMENTS

| | | | |
|---|---|---|---|
| 8,761,600 B2 | 6/2014 | Kim et al. | |
| 8,775,589 B2 | 7/2014 | Liss et al. | |
| 8,958,702 B2 | 2/2015 | Izumi | |
| 8,989,571 B2 | 3/2015 | Kim et al. | |
| 2002/0067883 A1* | 6/2002 | Lo | H04B 10/532 |
| | | | 385/24 |

(Continued)

FOREIGN PATENT DOCUMENTS

EP     2627021     8/2013

OTHER PUBLICATIONS

ITUT G.692 Oct. 1998.*
International Search Report dated Jul. 13, 2017 received in International Application No. PCT/IB2017/052318.

*Primary Examiner* — Oommen Jacob

(57) ABSTRACT

A system and method including polarization modulation of supervisory signals for reducing interference with data signals in a wavelength division multiplexed optical communication system. At least one supervisory signal for monitoring a transmission path and/or elements coupled to the transmission path is fast polarization modulated and launched with data signals onto the path. Polarization modulating of the supervisory signal reduces impact of the supervisory signal on the data signals and improves system performance.

20 Claims, 4 Drawing Sheets

(56) References Cited

U.S. PATENT DOCUMENTS

| | | |
|---|---|---|
| 2002/0101635 A1* | 8/2002 | Taketomi ............ H04B 10/0775 398/34 |
| 2005/0041968 A1* | 2/2005 | Takahashi ........... H04B 10/0775 398/30 |
| 2008/0038000 A1 | 2/2008 | Yu et al. |
| 2009/0103920 A1* | 4/2009 | Liu ........................ H04L 12/465 398/58 |
| 2012/0321303 A1* | 12/2012 | Zhang ................... H04B 10/532 398/45 |
| 2014/0079391 A1 | 3/2014 | Kim et al. |
| 2015/0117857 A1 | 4/2015 | Vassilieva et al. |

\* cited by examiner

POLARIZATION MODULATION OF SUPERVISORY SIGNALS FOR REDUCING INTERFERENCE WITH DATA SIGNALS

CROSS-REFERENCE TO RELATED APPLICATIONS

The present application claims the benefit of the filing date of U.S. Provisional Patent Application Ser. No. 62/347,268 filed Jun. 8, 2016, the entire disclosure of which is hereby incorporated herein by reference.

TECHNICAL FIELD

The present disclosure relates to optical communication systems and more particularly, to polarization modulation of supervisory signals for reducing interference with data signals.

BACKGROUND

In wavelength division multiplexing (WDM) optical communication systems a single optical fiber may be used to carry multiple optical signals. The multiple optical signals are multiplexed to form a multiplexed signal or WDM signal with each of the multiple signals being modulated on separate channels. Each channel may be at an associated wavelength that is separated from adjacent channels by a defined channel-spacing, e.g. according to a channel plan established by the International Telecommunications Union (ITU). The range of wavelengths that may be transmitted on the system is known as the system bandwidth. Systems may utilize their system bandwidth to carry a desired number of channels with desired modulation format and bit rate.

The WDM signal may include data channels for communicating user data signals between terminals coupled to the system. In addition to data channels, a WDM signal may include one or more optical supervisory channels. Optical supervisory channels are not used to communicate user data between terminals, but instead carry supervisory signals used for monitoring the transmission path and/or the elements coupled to the transmission path. The supervisory signals may be at a relatively low power compared to the data signals, and may be modulated using On-Off-Keying (OOK). The supervisory signals may also have relatively low data rates, e.g. in the kb/s range, compared to the data signals, which may be in the Gb/s range. The supervisory channels are provided at a different wavelength than the data channels to limit signal interference. Supervisory channels may be provided at the edges of the system bandwidth. In some configurations, the frequency spacing between supervisory channels and the next adjacent data channel may be 100 GHz.

One challenge associated with long-haul optical transmission paths is polarization dependent loss (PDL) incurred by signals launched on the path. In general, different polarizations suffer different amounts of loss during transmission. To mitigate the effects of PDL, it is known to incorporate a polarization scrambler in a supervisory signal transmitter. As is known, a polarization scrambler rapidly varies the polarization of a signal so the average degree of polarization (DOP) over time is close to zero. FIG. 5, for example, illustrates a prior art supervisory signal transmitter wherein supervisory signal data is modulated on the output of a laser 502 by a supervisory signal data modulator 504. The output of the supervisory signal data modulator is polarization scrambled by a polarization scrambler 506, the output of which is provided as the supervisory signal on a supervisory channel.

BRIEF DESCRIPTION OF THE DRAWINGS

Reference should be made to the following detailed description which should be read in conjunction with the following figures, wherein like numerals represent like parts.

DETAILED DESCRIPTION

Figure 5:
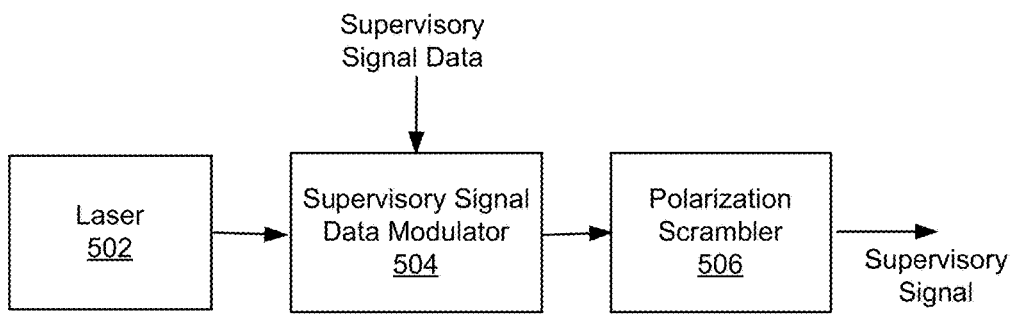
FIG. 5 is a block diagram of a prior art supervisory signal transmitter.

In general, it has been found that even though a supervisory signal may have less power than the data signals and is modulated at comparably low bit-rate, it can significantly distort a data signal through cross phase modulation (XPM) when the supervisory signal and the data signals co-propagate over long distances (e.g. several thousands of kilometers). The XPM may cause nonlinear polarization rotation (NLPR) of the state of polarization (SOP) of both the data signals and the supervisory signal when their powers are sufficiently high. Fast SOP changes of the data signals can cause problems for coherent receivers, which may only capable of tracking polarization state changes in the krad/s range. When the data signal SOP changes at a faster rate than what the receiver can track, the receiver may not be able to decode the data and results in Uncorrected Word Counts (UCWCs), i.e. lost data. Moreover, it has been found that polarization scrambling of the supervisory signal, as illustrated for example in the prior art configuration of FIG. 5, exacerbates the NLPR the supervisory signal imposes on the data channels.

A system and method consistent with the present disclosure mitigates the NPLR of data signals induced by supervisory signals in a WDM optical communication system. In general, in a system and method consistent with the present disclosure fast polarization modulation is imparted to the supervisory signals. Fast polarization modulation is distinct from polarization scrambling since fast polarization modulation establishes an average state of polarization (SOP) over a comparable short time interval of zero, whereas polarization scrambling establishes a random SOP and non-zero DOP over a similar time interval. In the presence of fast polarization modulation of the supervisory signals, the SOP of the data signals launched on the transmission path with the supervisory signals returns to its original position after a full period of the polarization modulation has taken place assuming that no linear transmission effects in fiber are changing the SOP. The data signal SOP thus effectively remains un-changed, thereby mitigating the fast SOP rotations that a single-polarization or polarization scrambled supervisory signal would cause through NLPR.

Figure 1:
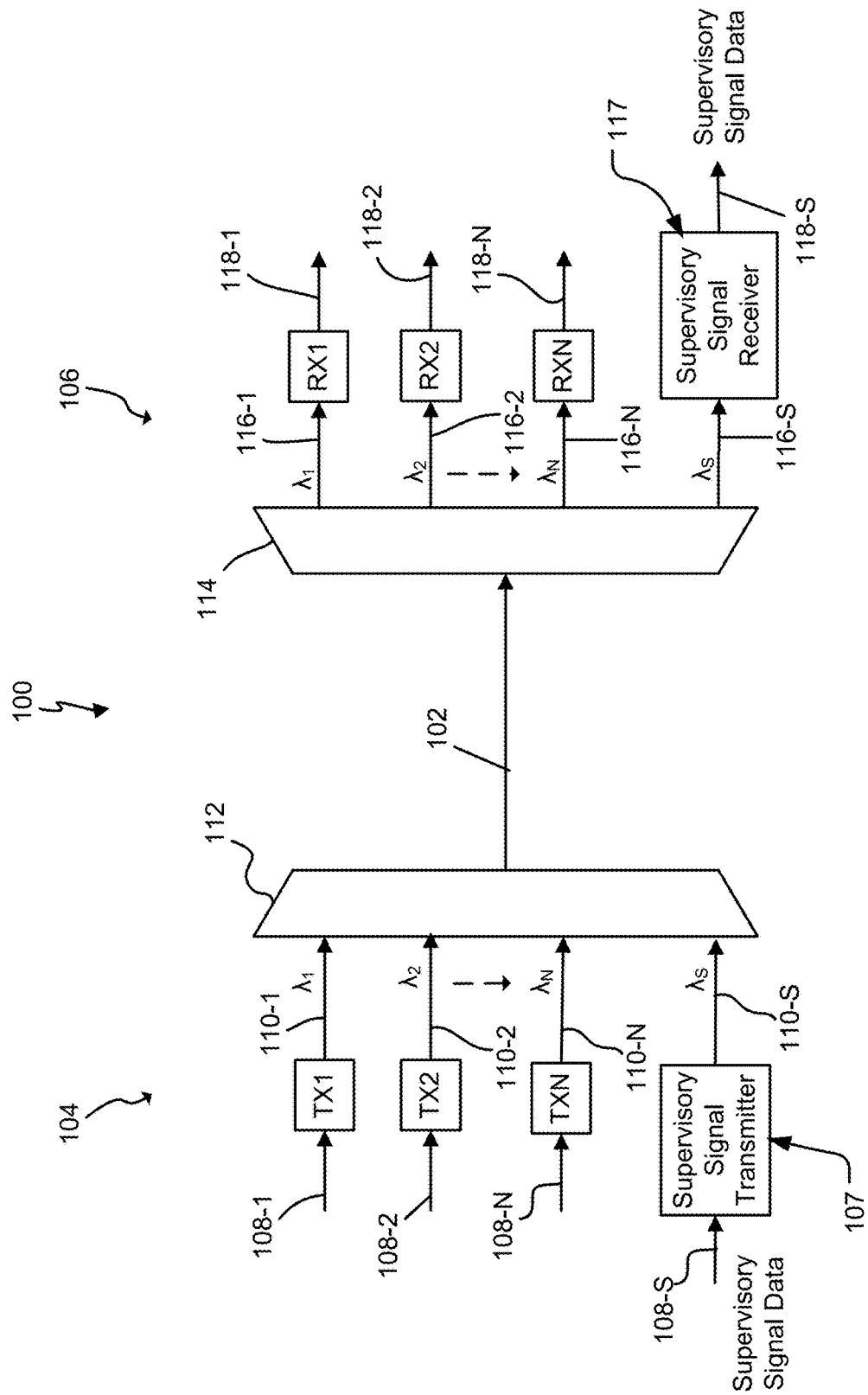
FIG. 1 is a block diagram of an embodiment of a system consistent with the present disclosure.

FIG. 1 is a simplified block diagram of one exemplary embodiment of a WDM transmission system 100 consistent with the present disclosure. The transmission system is configured to provide a plurality of optical data channels and one or more optical supervisory channels on an optical information path 102 from a transmitting terminal 104 to one or more remotely located receiving terminals 106. The exemplary system 100 may be a long-haul submarine system configured for coupling the channels from a transmitter to a receiver at a distance of 5,000 km, or more. Although exemplary embodiments are described in the context of an optical system and are useful in connection with a long-haul WDM optical system, the broad concepts discussed herein may be implemented in other communication systems transmitting and receiving other types of signals.

In the illustrated embodiment 100, each of a plurality of transmitters TX1, TX2 . . . TXN receives a data signal on an associated input port 108-1, 108-2 . . . 108-N, and transmits the data signal on associated data channel wavelength $\lambda_1, \lambda_2 \ldots \lambda_N$ with a channel spacing set according to a channel plan. The transmitters TX1, TX2 . . . TXN, of course, are shown in highly simplified form for ease of explanation. Those skilled in the art will recognize that each transmitter TX1, TX2 . . . TXN may include electrical and optical components configured for transmitting the data signal at its associated wavelength with a desired amplitude and modulation.

The illustrated embodiment 100 also includes a supervisory signal transmitter 107 that receives supervisory signal data on an input port 108-S and transmits a supervisory signal on an associated supervisory channel wavelength $\lambda_S$ with a fast polarization modulation in a manner consistent with the present disclosure. The supervisory channel has a data rate that is nominally lower than the data rate of the data channels. For example, the supervisory channel may, for example, have a data rate less than 1 Mb/s and the data rate of the data channels may be more than 1 Gb/s. Also, the supervisory channel may be placed at the edges of the optical system bandwidth. The frequency spacing between supervisory channels and the next adjacent data channels in some embodiments may be 800 GHz or less.

The transmitted channels are respectively carried on a plurality of paths 110-1, 110-2 . . . 110-N and 110-S. The data channels and supervisory channel are combined into an aggregate signal on optical path 102 by a multiplexer or combiner 112. The optical information path 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_1, \lambda_2 \ldots \lambda_N$ and $\lambda_S$ onto associated paths 116-1, 116-2 . . . 116-N and 116-S, respectively. The paths 116-1, 116-2 . . . 116-N are coupled to associated receivers RX1, RX2 . . . RXN and 117. The receivers RX1, RX2 . . . RXN are configured to demodulate the data signal received thereby and provide an associated output data signal on an associated output path 118-1, 118-2, 118-3, 118-N, respectively. The path 116-S is coupled to an associated supervisory signal receiver 117. The supervisory receiver 117 is configured to demodulate the supervisory signal received on path 116-S and provide an associated output supervisory signal on path 118-S.

Those skilled in the art will recognize that the system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. The system 100 may be configured to transmit any number of optical supervisory signals on associated optical supervisory channels, but for ease of illustration and explanation only a single supervisory signal transmitter 107 for transmitting a single supervisory channel is shown.

Also, in the illustrated embodiment 100, for ease of illustration and explanation the supervisory signal transmitter 107 and the supervisory signal receiver 117 are shown as being disposed at the transmitting 104 and receiving terminals 106, respectively. It is to be understood, however, that a supervisory signal may originate from, or be received by, any device on the optical transmission path 102. For example, the supervisory signals may originate from or be transmitted by an optical amplifier configuration, an optical add-drop multiplexer, a branch terminal, etc.

Figure 2A:
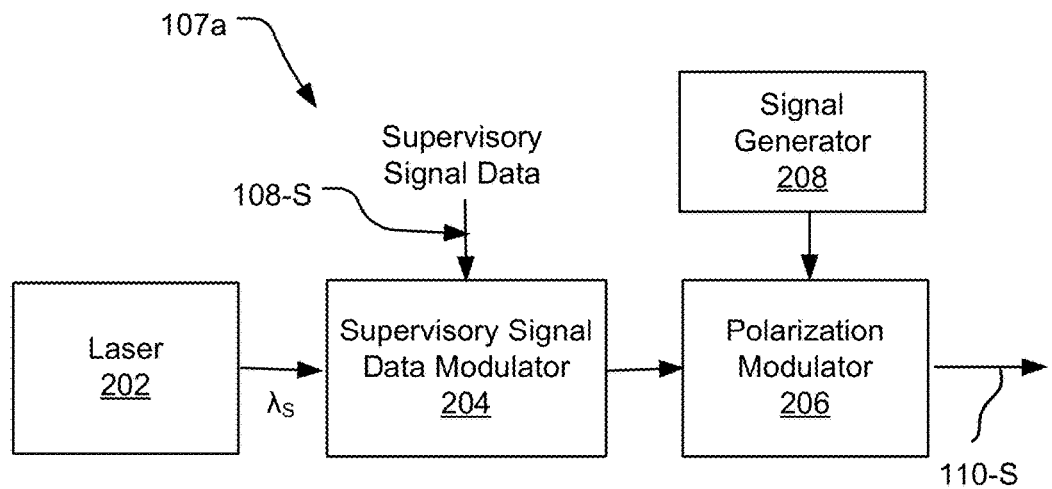
FIG. 2A is a block diagram of an embodiment of a supervisory signal transmitter consistent with the present disclosure.

Imparting a fast polarization modulation on a supervisory signal can be accomplished in a variety of ways. FIG. 2A, for example, is a simplified block diagram of one embodiment of a supervisory signal transmitter 107a consistent with the present disclosure. The illustrated exemplary embodiment 107a includes a laser 202, e.g. a known continuous-wave laser, for providing an optical output at a carrier wavelength $\lambda_S$, a supervisory signal data modulator 204 for modulating supervisory signal data received on path 118-S onto the wavelength $\lambda_S$, and a polarization modulator 206 for modulating the polarization of the output of the supervisory signal data modulator 204 in response to the output of a signal generator 208.

The supervisory signal data modulator 204 may take a known configuration for modulating supervisory signal data on the wavelength $\lambda_S$ according to a desired modulation format. For example, the supervisory signal data modulator 204 may be configured as a known on-off-keying (OOK) modulator. The output of the supervisory signal data modulator 204 is a modulated signal having wavelength $\lambda_S$ and is modulated with the supervisory signal data according to the modulation format applied by supervisory signal data modulator 204. The supervisory signal data may be modulated with relatively low data rate compared to the data rate of the data signals. For example, the supervisory signal may have a data rate may be in the range of a hundreds of kb/s, whereas the data signals may have a data rate in the range of GB/s.

The polarization modulator 206 may take a known configuration for modulating the polarization of the modulated signal output of the supervisory signal data modulator 204 in response to the output of the signal generator 208. For example, the polarization modulator 206 may be a known LiNbO3 polarization modulator. The output of the polarization modulator 206 is provided on path 110-S as the supervisory signal to be combined and launched on the optical transmission path 102 with the data signals. The output of the signal generator 208 may be a periodic or non-periodic (e.g. random) and sets the polarization modulation rate for the supervisory signal.

Figure 2B:
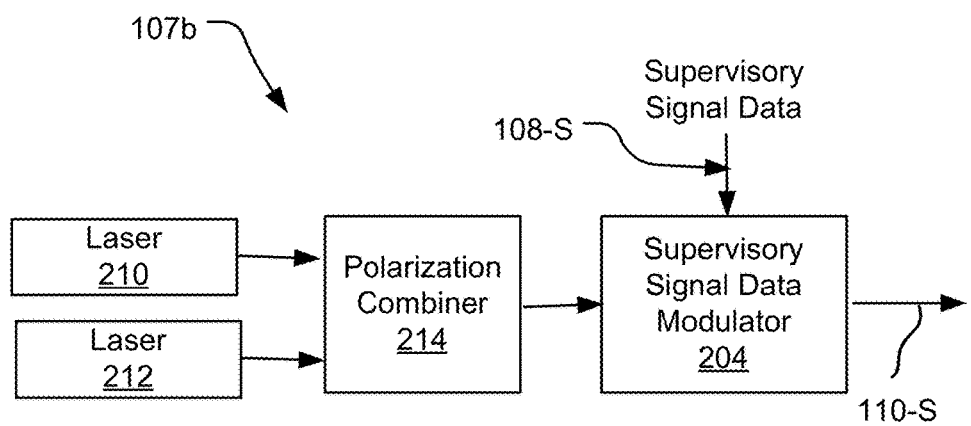
FIG. 2B is a block diagram of another embodiment of a supervisory signal transmitter consistent with the present disclosure.

Another configuration 107b for imparting a fast polarization modulation on a supervisory signal is illustrated in FIG. 2B. The embodiment 107b illustrated in FIG. 2B includes first 210 and second 212 lasers, e.g. known continuous-wave lasers, for providing an optical output on respective carrier wavelengths, a polarization combiner 214 and a supervisory signal data modulator 204 for modulating supervisory signal data received on path 118-S onto the wavelength output of the polarization combiner 214.

The lasers 210 and 212 have slightly different carrier wavelengths, e.g. with a frequency difference of about 1 GHz, and have about the same optical power and orthogonal polarizations. When the outputs of the lasers 210 and 212 are combined by the polarization combiner 214, the polarization of the output of the polarization combiner 214 is rapidly changing with an average DOP of zero. The supervisory signal data modulator 204 modulates supervisory signal data on the output of the polarization modulator 214 according to a desired modulation format. The output of the supervisory signal data modulator 204 is a modulated signal and is provided on path 110-S as the supervisory signal to be combined and launched on the optical transmission path 102 with the data signals.

Figure 2C:
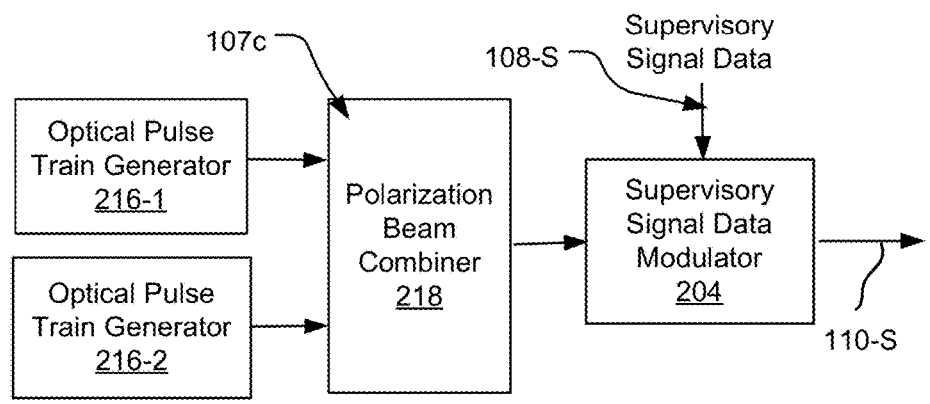
FIG. 2C is a block diagram of another embodiment of a supervisory signal transmitter consistent with the present disclosure.

FIG. 2C is a simplified block diagram of another configuration 107c for imparting a fast polarization modulation on a supervisory signal consistent with the present disclosure. The embodiment 107c illustrated in FIG. 2C includes first 216-1 and second 216-2 optical pulse train generators, a polarization beam combiner 218 and a supervisory signal data modulator 204 for modulating supervisory signal data received on path 118-S onto the wavelength output of the polarization beam combiner 218.

Those of ordinary skill in the art will recognize other configurations for imparting a fast polarization modulation on a supervisory signal consistent with the present disclosure. For example, a system consistent with the present disclosure may impart fast polarization modulation by providing fast polarization spinning (around a great circle of the Poincaré sphere) combined with a relatively slow polarization scan (i.e. slowly changing the plane of the great circle). The embodiments described herein are thus provided by way of explanation, not of limitation.

The optical pulse train generators 216-1, 216-2 each provide a continuous series of optical pulses and may be implemented in a variety of ways. In one example, the optical pulse train generators 216-1, 216-2 may be implemented by launching the output of continuous-wave lasers into associated pulse carvers. The polarization beam combiner 218 may be configured to split the pulses from the optical pulse train generators 216-1, 216-2, e.g. using a polarization beam splitter and then delay one replica of the pulses from the pulse train generators 216-1, 216-2 by half of the pulse period for the pulses and recombine the split pulses. The combined signal may be provided as the output of the polarization beam combiner 218 and has a fast polarization modulation with a DOP of zero. The supervisory signal data modulator 204 modulates supervisory signal data on the output of the polarization beam combiner 218 according to a desired modulation format. The output of the supervisory signal data modulator 204 is a modulated signal and is provided on path 110-S as the supervisory signal channel to be combined and launched on the optical transmission path 102 with the data signals.

In general, the polarization modulation frequency of the supervisory signal should be as high as possible and fast enough such that the supervisory signal has an average DOP of about zero, e.g. less than 2%, in the walk-off time (i.e. the group velocity difference in the optical path) between the supervisory signal and the data signals to thereby mitigate XPM-induced polarization scattering between the supervisory signal and the data signals. The polarization modulation frequency will depend on the system configuration but may be between about 100 MHz and a few tens of GHZ in some embodiments. Optically, the polarization modulation of the supervisory signal may be between about 629.18 mega radians (Mrad)/second and a few thousand giga radians (Grad)/second.

Although the polarization modulation frequency of the supervisory signal is preferably fast enough such that the supervisory signal has an average DOP of about zero in the walk-off time between the supervisory signal and the data signals, it has been found that lower power supervisory signals can have larger DOP compared to higher power supervisory signals. In general, the lower the DOP for the supervisory signal, the better. However, low power supervisory signals that are polarization modulated consistent with the present invention may have a DOP of up to 90% while mitigating impact of XPM between the supervisory signal and data signal consistent with the present disclosure.

Mitigating impact of XPM between the supervisory signal and the data signals by applying a fast polarization modulation consistent with the present disclosure provides an improvement in system performance. Table 1 below, for example, illustrates an experimentally obtained rate of uncorrected word count (UCWC) in 60 seconds vs. polarization modulation frequency applied by the polarization modulator 206 in one embodiment consistent with the present disclosure.

TABLE 1

| Modulation frequency [GHz] | 0.5 | 1 | 2 | 4 | 8 | 12 | 16 | 20 |
|---|---|---|---|---|---|---|---|---|
| UCWC in 60 s | 86 | 73 | 71 | 80 | 42 | 33 | 11 | 10 |

Uncorrected word count (UCWC) in 60 s as function of the polarization modulation frequency at high supervisory channel power.

As shown in Table 1, for a modulation frequency between 0.5 GHz and 20 GHz the rate of uncorrected word count in one embodiment of a system consistent with the present disclosure is almost monotonously decreasing for increasing polarization modulation frequencies.

Figure 3:
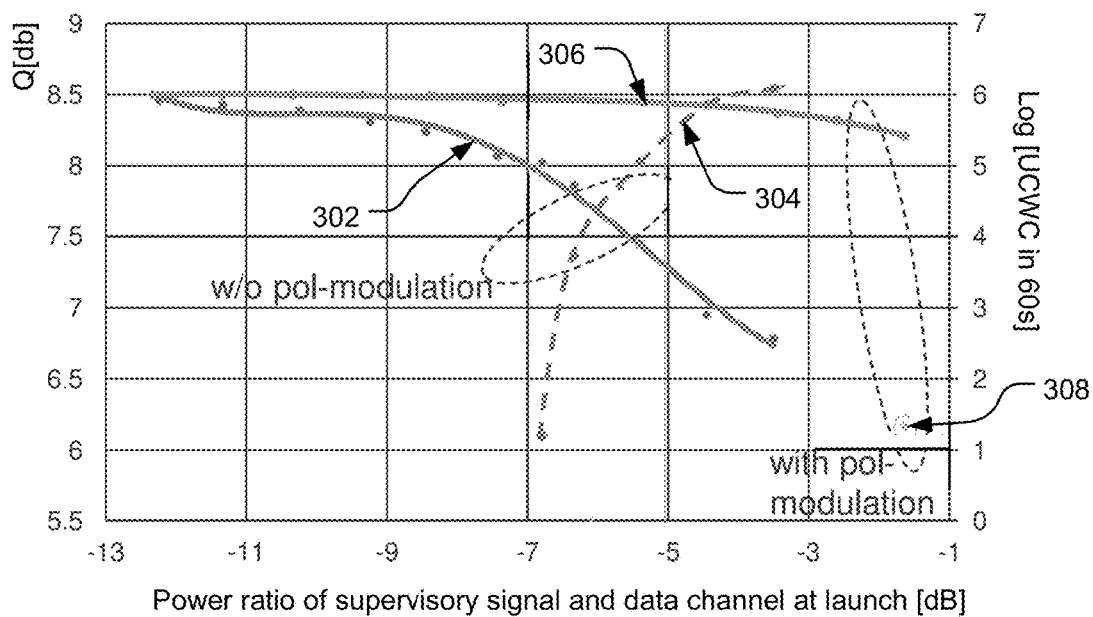
FIG. 3 is a plot of Q factor [dB] and uncorrected word count (UCWC) vs. the power ratio of a supervisory signal and a data signal at launch for an embodiment of a system consistent with the present disclosure.

FIG. 3 illustrates performance of a system including a supervisory signal with fast polarization modulation consistent with the present disclosure compared to performance of prior art system with polarization scrambling instead of fast polarization modulation. The data shown in FIG. 3 was experimentally obtained from a system including one-hundred 100 Gb/s coherent data signals in the presence of a supervisory signal transmitted over 13,000 km on a positive dispersion path in a recirculating loop configuration. The transmission path was constructed with +D fiber with a chromatic dispersion of ~20 ps/nm/km. It has been found that in a system consistent with the present disclosure, the relative delay between the data channels and the supervisory channel caused by dispersion on the transmission path (e.g. +D or dispersion management) is helpful. In the reference frame of the data channels, the SOP of the supervisory signal appears to be slowly modulated.

In the system associated with FIG. 3, erbium doped fiber amplifiers (EDFAs) were spaced at 65 km and had a 34 nm bandwidth. The data signal modulation format was Dual Polarization Quaternary Phase Shift Keying (DP-QPSK)

and the data channel spacing was 40 GHz. A 200 kb/s OOK modulation of the supervisory signal was emulated by a square wave of the same frequency. The supervisory channel was located 100 GHz apart from the edge data channel. Within the 2.5 µs long pulses of the supervisory signal, the SOP of the signal was modulated at about 1 GHz using a fast polarization modulator driven by a sinusoidal signal from an RF generator, e.g. as shown in FIG. 2A. To emulate the prior art configuration the SOP of the supervisory signal was scrambled at a rate of about 1 Mrad/s without polarization modulation before inserting it into the transmission path.

FIG. 3 illustrates the Q penalty and the uncorrected word count (UCWC) in 60 s recording time vs. the ratio of the supervisory signal power to the power of a data channel immediately adjacent to the supervisory channel. The polarization modulation did not change the launched power of the supervisory signal. Plot 302 illustrates the Q penalty vs. the ratio of the supervisory signal power to power of the data channel immediately adjacent the supervisory channel in the system without polarization modulation consistent with the present disclosure. Plot 304 illustrates the UCWC vs. the ratio of the supervisory signal power to power of the data channel immediately adjacent the supervisory channel in the system without polarization modulation consistent with the present disclosure. Plot 306 illustrates the Q penalty vs. the ratio of the supervisory signal power to power of the data channel immediately adjacent the supervisory channel in the system with polarization modulation consistent with the present disclosure. Point 308 illustrates the UCWC vs. the ratio of the supervisory signal power to power of the data channel immediately adjacent the supervisory channel in the system with polarization modulation consistent with the present disclosure. As shown, in a system with polarization modulation consistent with the present disclosure the power ratio of the supervisory signal to the data channel can be increased by more than 5 dB compared to a prior art configuration before significant UCWC incidents occur. Also in a system implementing polarization modulation consistent with the present disclosure the Q-penalty stays significantly smaller compared to a prior art system including polarization scrambling.

Figure 4:
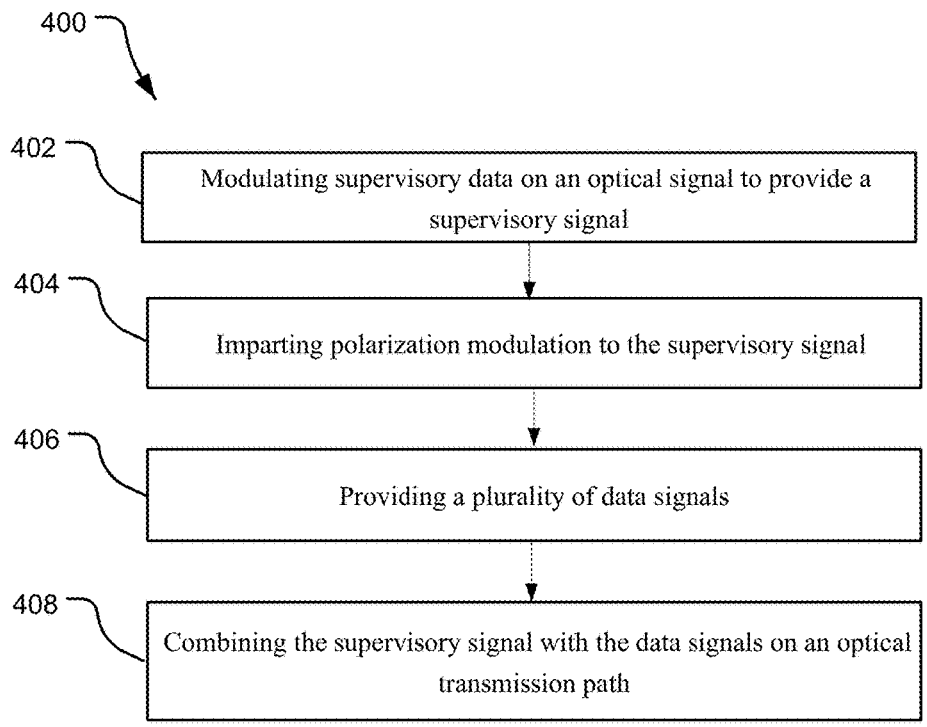
FIG. 4 is a flow chart illustrating an exemplary method consistent with the present disclosure.

FIG. 4 is a flow chart illustrating a method 400 consistent with the present disclosure. Operation 402 includes modulating supervisory data on an optical signal to provide supervisory data and operation 404 includes imparting polarization modulation to the supervisory signal. Operations 402 and 404 may be performed using, for example, any of the configurations shown in FIGS. 2A-2C. A plurality of data signals are provided 406 and the supervisory signal is combined 408 with the data signals on an optical transmission path. While FIG. 4 illustrates various operations according to an exemplary embodiment, it is fully contemplated herein that in other embodiments of the present disclosure, the operations depicted in FIG. 4 and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

According to one aspect of the disclosure there is provided a method including: modulating supervisory data on an optical signal to provide a supervisory signal; imparting polarization modulation to the supervisory signal; providing a plurality of data signals; and combining the supervisory signal with the data signals on an optical transmission path.

According to another aspect of the disclosure there is provided a method including: modulating supervisory data on an optical signal to provide a supervisory signal; imparting polarization modulation to the supervisory signal at a polarization modulation rate of 629.18 Mrad/s or more, the supervisory signal having a first data rate; providing a plurality of data signals, the data signals having a second data rate higher than the first data rate; and combining the supervisory signal with the data signals on an optical transmission path.

According to another aspect of the disclosure there is provided a system including: a plurality of data signal transmitters, each of the data signal transmitters being configured for transmitting an associated data signal; at least one supervisory signal transmitter, the supervisory signal transmitter being configured for transmitting an associated supervisory signal with polarization modulation; and a multiplexer configured to combine the data signals and the supervisory signal on an optical transmission path.

It will be appreciated by those skilled in the art that any block diagrams herein represent conceptual views of illustrative circuitry embodying the principles of the disclosure. The functions of the various elements shown in the figures, including any functional blocks, may be provided through the use of dedicated hardware as well as hardware capable of executing software in association with appropriate software.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection. As used herein, use of the term "nominal" or "nominally" when referring to an amount means a designated or theoretical amount that may vary from the actual amount.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method comprising:
    modulating supervisory data on an optical signal to provide a supervisory signal;
    imparting polarization modulation to the supervisory signal at a frequency of 100 MHz or more;
    providing a plurality of data signals; and
    combining the supervisory signal with the data signals on an optical transmission path, wherein the data signals have a data rate that is nominally higher than the data rate of the supervisory signal.

2. A method according to claim 1, wherein the data signals have a data rate greater than 1 Gb/s and the supervisory signal has a data rate of less than 1 Mb/s.

3. A method according to claim 1, wherein the imparting polarization modulation to the supervisory signal comprises modulating the polarization of the supervisory signal so that the supervisory signal has an average degree of polarization (DOP) of about zero in the walk-off time between a data channel and the supervisory signal.

4. A method according to claim 1, wherein the data signals and the supervisory signal are within a system bandwidth and the supervisory signal is at an edge of the system bandwidth.

5. A method according to claim 1, wherein the supervisory signal is separated from the next adjacent data signal by 800 GHz or less.

6. A method according to claim 1, wherein the imparting polarization modulation to the supervisory signal comprises modulating the supervisory signal using a polarization modulator in response to a signal from signal generator.

7. A method comprising:
modulating supervisory data on an optical signal to provide a supervisory signal;
imparting polarization modulation to the supervisory signal at 629.18 mega radians/second or more, the supervisory signal having a first data rate;
providing a plurality of data signals, the data signals having a second data rate higher than the first data rate; and
combining the supervisory signal with the data signals on an optical transmission path.

8. A system comprising:
a plurality of data signal transmitters, each of the data signal transmitters being configured for transmitting an associated data signal;
at least one supervisory signal transmitter, the supervisory signal transmitter being configured for transmitting an associated supervisory signal with polarization modulation at a polarization modulation rate of about 100 MHz or more;
a multiplexer configured to combine the data signals and the supervisory signal on an optical transmission path; and
wherein the data signals have a data rate that is nominally higher than the data rate of the supervisory signal.

9. A system according to claim 8, wherein the data signals have a data rate greater than 1 Gb/s and the supervisory signal has a data rate of less than 100 Mb/s.

10. A system according to claim 8, wherein the supervisory signal has an average degree of polarization (DOP) of about zero in the walk-off time between a data channel and the supervisory signal.

11. A system according to claim 8, wherein the data signals and the supervisory signal are within a system bandwidth and the supervisory signal is at an edge of the system bandwidth.

12. A system according to claim 8, wherein the supervisory signal is separated from the next adjacent data signal by 800 GHz or less.

13. A system according to claim 8, wherein supervisory signal transmitter comprises a supervisory signal data modulator configured to provide a modulated signal and a polarization modulator configured to modulate the polarization of the modulated signal in response to a signal from signal generator.

14. A method comprising:
modulating supervisory data on an optical signal to provide a supervisory signal;
imparting polarization modulation to the supervisory signal so that the supervisory signal has an average degree of polarization (DOP) of about zero in the walk-off time between a data channel and the supervisory signal;
providing a plurality of data signals; and
combining the supervisory signal with the data signals on an optical transmission path, wherein the data signals have a data rate that is nominally higher than the data rate of the supervisory signal.

15. A method according to claim 1, wherein the data signals have a data rate greater than 1 Gb/s and the supervisory signal has a data rate of less than 1 Mb/s.

16. A method according to claim 1, wherein the imparting polarization modulation to the supervisory signal comprises modulating the supervisory signal using a polarization modulator in response to a signal from signal generator.

17. A system comprising:
a plurality of data signal transmitters, each of the data signal transmitters being configured for transmitting an associated data signal;
at least one supervisory signal transmitter, the supervisory signal transmitter being configured for transmitting an associated supervisory signal with polarization modulation and an average degree of polarization (DOP) of about zero in the walk-off time between a data channel and the supervisory signal;
a multiplexer configured to combine the data signals and the supervisory signal on an optical transmission path; and
wherein the data signals have a data rate that is nominally higher than the data rate of the supervisory signal.

18. A system according to claim 8, wherein the data signals have a data rate greater than 1 Gb/s and the supervisory signal has a data rate of less than 100 Mb/s.

19. A system according to claim 8, wherein supervisory signal transmitter comprises a supervisory signal data modulator configured to provide a modulated signal and a polarization modulator configured to modulate the polarization of the modulated signal in response to a signal from signal generator.

20. A method according to claim 7, wherein the imparting polarization modulation to the supervisory signal comprises modulating the polarization of the supervisory signal so that the supervisory signal has an average degree of polarization (DOP) of about zero in the walk-off time between a data channel and the supervisory signal.

* * * * *